T. YOUNG.
BRICK MOLDING MACHINE.
APPLICATION FILED MAR. 24, 1909.
958,898.
Patented May 24, 1910.
2 SHEETS—SHEET 2.
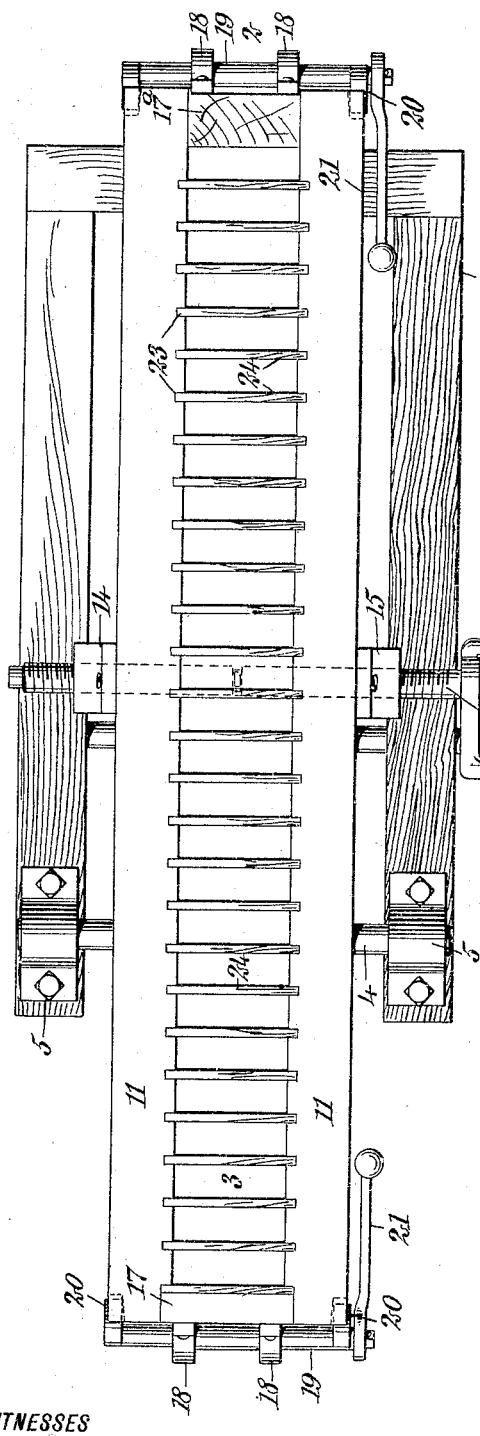
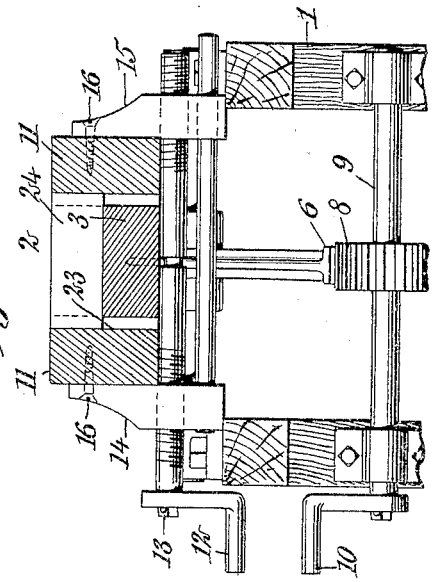
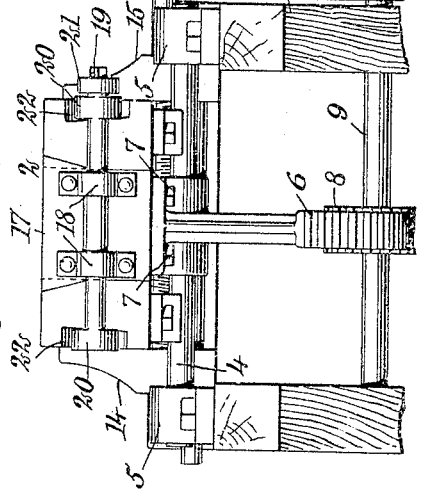
WITNESSES
INVENTOR
Timothy Young
BY
ATTORNEYS

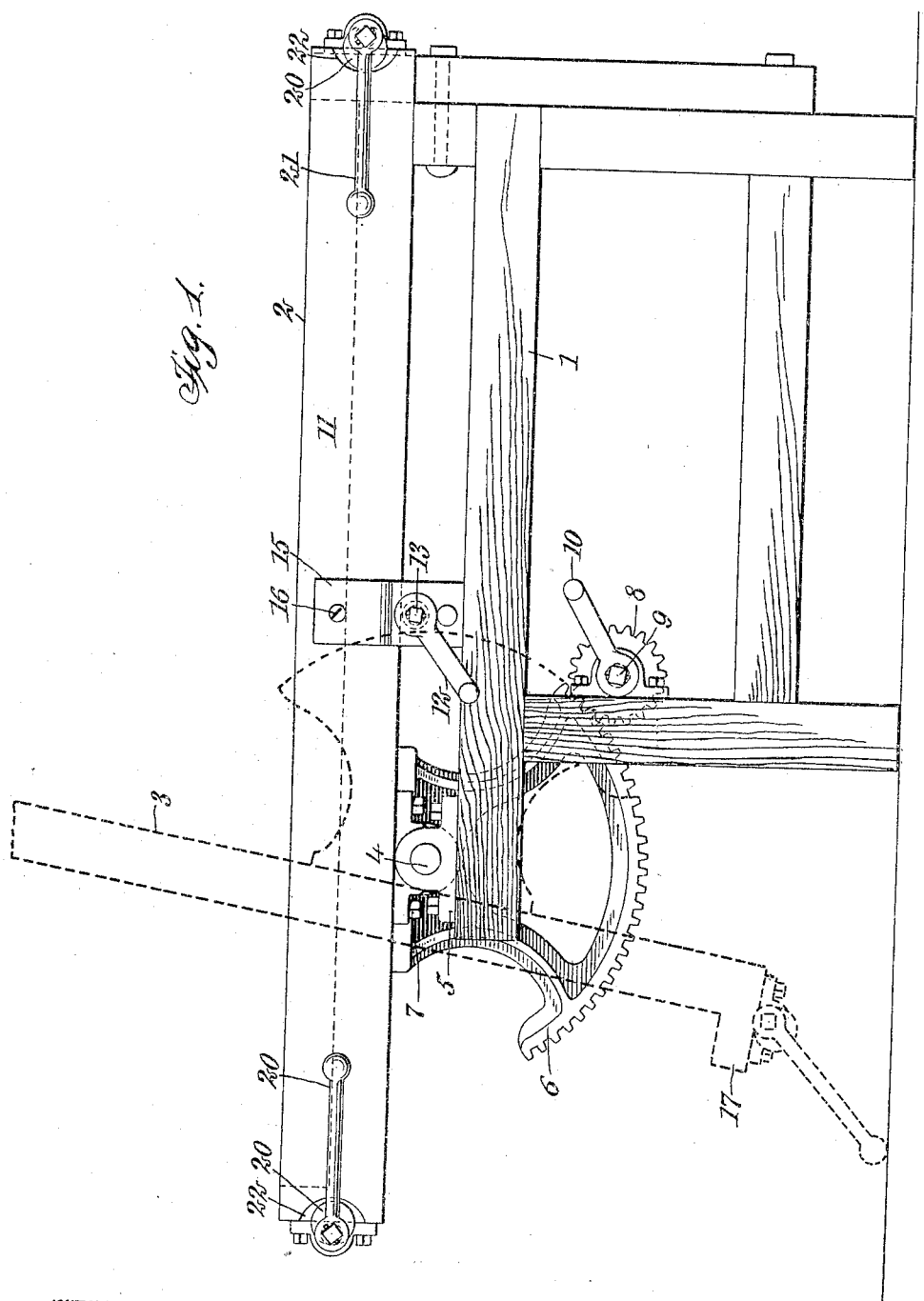

UNITED STATES PATENT OFFICE.

TIMOTHY YOUNG, OF LAKELAND, FLORIDA.

BRICK-MOLDING MACHINE.

958,898.   Specification of Letters Patent.   Patented May 24, 1910.

Application filed March 24, 1909. Serial No. 485,447.

*To all whom it may concern:*

Be it known that I, TIMOTHY YOUNG, a citizen of the United States, and a resident of Lakeland, in the county of Polk and State of Florida, have invented a new and Improved Brick-Molding Machine, of which the following is a full, clear, and exact description.

This invention relates to brick molding machines of that type in which the material is forced into the mold by tamping, the bricks being then removed to be dried and baked.

An object of the invention is to provide a machine in which the bricks may be molded, in which the bricks are readily accessible, and which will separate from the bricks with the least danger of breaking and crumbling the same. This and other objects will be more fully described hereinafter and particularly pointed out in the claims.

Reference is to be had to the accompanying drawings forming a part of this specification, in which like reference characters denote corresponding parts in all the views, and in which—

Figure 1 is a side elevation of the device, showing in dotted lines the bottom of the mold tilted up ready to remove the bricks; Fig. 2 is a plan view; Fig. 3 is an end elevation looking from left to right in Fig. 2; and Fig. 4 is a vertical cross section.

Referring more particularly to the separate parts of the device, 1 is a frame supporting in any suitable manner the mold 2. The bed 3 of this mold is rotatably supported on the frame 1 by means of a shaft 4 revolving in bearings 5 on the frame 1. The bed 3 has a gear sector 6 secured thereto in any suitable manner, as by the bolts 7. Meshing with the gear sector 6 is a pinion 8 fixed on a shaft 9, which is rotatably mounted in the frame 1 and is adapted to be rotated by means of a hand crank 10.

The sides 11 of the mold 2 are movable toward and from each other and relatively to the frame 3. These sides are moved by means of a crank 12, which engages a screw-threaded shaft 13, having right and left threads adapted to engage internal threads in the clamp members 14 and 15, which are fixed to the sides 11 by any suitable means, such as screws 16. Rotatably secured to the upwardly extending ends 17 17ᵃ of the bed 3 in any suitable manner as by the collars 18 are the shafts 19. On the ends of the shafts 19 are eccentric blocks 20 which are adapted to be rotated by handles 21 to bring the eccentric blocks into the grooves 22 in the outer surface of the sides 11, whereby the sides 11 are locked together and to the base. Grooves 23 are formed opposite each other at suitable intervals on the inner surface of the sides and extend down to the bed or bottom 3. In these grooves are adapted to be fitted dividing spacing pieces 24.

In operating the device the mold is placed as in full lines in Fig. 1, with its bed or bottom resting horizontally on the frame. The sides of the mold are clamped together and locked in position. The cross spacing pieces are all in place. The material to form the bricks is then put into the mold and tamped into the spaces between the sides of the mold and the spacing pieces. After the bricks thus formed have set sufficiently the handle 12 is turned, moving the sides 11 apart. The bed or bottom 3 is then tilted up by means of the crank 10, to an almost vertical position, in which position the bricks are supported by the end 17 of the bed 3 and are readily accessible to be removed to the drying room or oven.

Having thus described my invention what I claim as new and desire to be secured by Letters Patent is:

1. In a device of the class described, a frame, a mold supported by said frame, a bottom for said mold, sides for said mold, movable relatively to each other, clamps on said sides, a right and left screw carrying said clamps, means for operating said clamps, eccentric locks for holding said sides in position, and means for operating said locks.

2. In a device of the class described, the combination with a frame, of a mold comprising side members and a bottom rotatably supported independent of said side members on said frame, a gear sector secured to the under side of said bottom and away from the sides thereof, and a pinion on said frame adapted to turn said gear sector.

3. In a device of the class described, the combination with a frame, of a mold supported by said frame, a bottom rotatably supported by said frame, grooved sides movably supported on said frame, spacing pieces seated in the grooves in said sides, rotatable shafts moving in bearings on the ends of said bottom, eccentric locks on said shafts, adapted to lock said sides to hold them to the bottom, clamping members on said sides, and a double threaded shaft adapted to draw said clamping members together.

4. In a device of the class described, the combination with a frame, of a mold supported by said frame, a bottom for said mold rotatably supported on said frame, a gear sector secured on said bottom, a pinion on said frame meshing with said gear sector, means for rotating said pinion, sides on said mold movable relatively to the base, clamps secured to the sides, right and left hand screws working in said clamps adapted to draw the sides together, a handle adapted to rotate said screws, eccentric locks at each end of the mold adapted to lock the sides in position, and means for operating said locks.

In testimony whereof I have signed my name to this specification in the presence of two subscribing witnesses.

TIMOTHY YOUNG.

Witnesses:
T. J. HOOKS,
G. W. McCORQUODALE.